United States Patent
Jeong et al.

(10) Patent No.: US 10,639,605 B2
(45) Date of Patent: May 5, 2020

(54) APPARATUS FOR PRODUCING CARBON NANOTUBE AGGREGATE

(71) Applicant: Foundation of Soongsil University-Industry Cooperation, Seoul (KR)

(72) Inventors: Young Jin Jeong, Seoul (KR); Hyeon Jun Song, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 16/485,248

(22) PCT Filed: Dec. 6, 2017

(86) PCT No.: PCT/KR2017/014206
§ 371 (c)(1),
(2) Date: Aug. 12, 2019

(87) PCT Pub. No.: WO2018/147538
PCT Pub. Date: Aug. 16, 2018

(65) Prior Publication Data
US 2019/0374918 A1    Dec. 12, 2019

(30) Foreign Application Priority Data

Feb. 13, 2017   (KR) .......................... 10-2017-0019586

(51) Int. Cl.
*C01B 32/16*   (2017.01)
*B01J 6/00*    (2006.01)
*B01J 4/00*    (2006.01)

(52) U.S. Cl.
CPC ............... *B01J 6/008* (2013.01); *B01J 4/002* (2013.01); *C01B 32/16* (2017.08); *B01J 2204/005* (2013.01)

(58) Field of Classification Search
CPC ...... B01J 6/008; B01J 4/002; B01J 2204/005; C01B 32/16
USPC .......................................................... 422/187
See application file for complete search history.

(56) References Cited

U.S. PATENT DOCUMENTS

2010/0296983 A1* 11/2010 Shiraki .................... B01J 4/002
422/198

FOREIGN PATENT DOCUMENTS

| JP | 2005-350275 A | 12/2005 |
| JP | 2012-046841 A | 3/2012 |
| KR | 10-0646221 B1 | 11/2006 |
| KR | 10-2010-0108599 A | 10/2010 |

(Continued)

OTHER PUBLICATIONS

International Search Report for International Application No. PCT/KR2017/014206, dated Jun. 1, 2018.

*Primary Examiner* — Huy Tram Nguyen
(74) *Attorney, Agent, or Firm* — Pearne & Gordon LLP

(57) ABSTRACT

A carbon nanotube assembly manufacturing apparatus includes a synthesis furnace having a carbon nanotube synthesis space inside, and a gas supply unit that is disposed at a lower portion of the synthesis furnace and ejects an inert gas through a plurality of nozzles to converge carbon nanotubes discharged from the synthesis furnace. The plurality of nozzles are arranged along an arc of the gas supply unit so as to surround the carbon nanotubes discharged from the synthesis furnace and are individually adjustable.

7 Claims, 6 Drawing Sheets

(56) References Cited

FOREIGN PATENT DOCUMENTS

| KR | 10-1113758 B1 | 2/2012 |
|----|---------------|--------|
| KR | 10-1155057 B1 | 6/2012 |
| KR | 10-2016-0064103 A | 6/2016 |

* cited by examiner

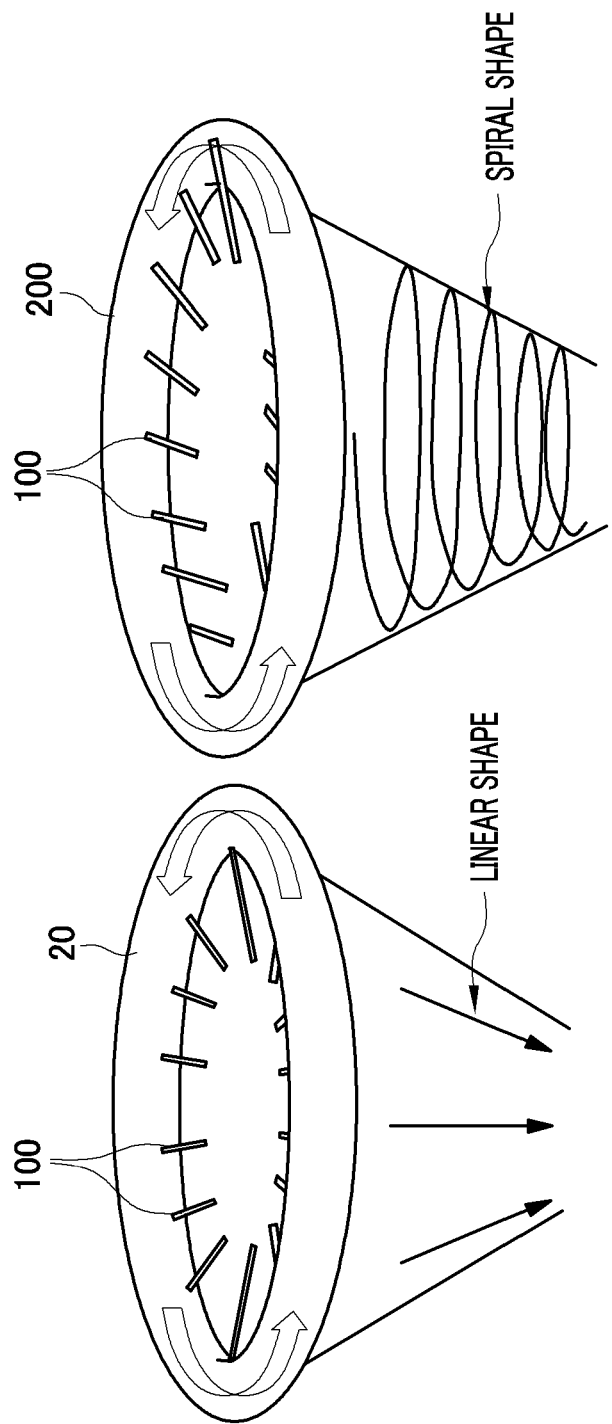

APPARATUS FOR PRODUCING CARBON NANOTUBE AGGREGATE

BACKGROUND OF THE INVENTION

1. Field of the Invention

The present invention relates to a carbon nanotube assembly manufacturing apparatus.

2. Description of the Related Art

In general, a carbon nanotube assembly synthesized in a synthesis furnace is converged through a wet or dry process, and the converged carbon nanotube assembly has a fiber shape. The wet process is a method in which the synthesized carbon nanotube assembly is converged while passing through a bath that is installed at a lower portion of the synthesis furnace and contains a solvent such as water or ethanol. In order to prevent explosion due to a hydrogen gas used as a transfer gas, the bath has to be closed, and in order to process the hydrogen contained in the closed bath, a hydrogen collection device is installed and used. When the hydrogen collection device is used, there is a problem that it is difficult for an operator to quickly cope with a problem such as cutting of a carbon nanotube fiber.

On the other hand, since an operation is performed in an open environment during the dry process in which an inert gas is used, the operator may approach a facility at any time if necessary, and thereby, efficient production may be made. That is, a technique of converging the carbon nanotube assembly through the dry process may simplify a process of manufacturing the carbon nanotube assembly, and thus, it is possible to manufacture a stable and uniform carbon nanotube assembly. In addition, since a separate hydrogen collection device is not required in a production process, it is possible to greatly increase easiness of operation and flexibility of a process.

In addition, if the synthesized carbon nanotube assembly is wound in a converged state, a cutting phenomenon is reduced, and thereby, it is very advantageous for a continuous process. However, since the carbon nanotube assembly synthesized according to a process of manufacturing the carbon nanotube assembly is very weak, it is difficult to continuously wind the carbon nanotube assembly. Therefore, it is necessary to find a solution for solving such a problem.

In this regard, Korean Patent Application No. 10-2016-0064103 (title of the invention: SYNTHESIS APPARATUS USING GAS SEALING) discloses a synthesis apparatus replacing an existing hydrogen collection device as a method of blocking outside air through nitrogen gas.

SUMMARY OF THE INVENTION

An embodiment of the present invention is made to solve the above-described problems, and the present invention provides a carbon nanotube assembly manufacturing apparatus which increases stability of a carbon nanotube assembly manufacturing process using a dry process and manufactures a carbon nanotube assembly with a high quality.

However, the technical problem to be solved by the present embodiment is not limited to the above-described technical problems, and there may be other technical problems.

In order to solve the above-described technical problems, a carbon nanotube assembly manufacturing apparatus according to an embodiment of the present invention includes a synthesis furnace having a carbon nanotube synthesis space inside, and a gas supply unit that is disposed at a lower portion of the synthesis furnace and ejects an inert gas through a plurality of nozzles to converge carbon nanotubes discharged from the synthesis furnace. The plurality of nozzles are arranged along an arc of the gas supply unit so as to surround the carbon nanotubes discharged from the synthesis furnace and are individually adjustable.

According to the present invention, it is possible to increase a strength and a uniformity ratio of a converged carbon nanotube assembly by forming a vortex using an inert gas and by twisting and converging the carbon nanotube assembly using the vortex.

In addition, since an inert gas not only blocks outside air but also dilutes hydrogen used for synthesis, stability is greatly increased and production may be possible in an open environment, and thus, an operator may quickly cope with a problem situation such as cutting by directly approaching a synthesis facility.

BRIEF DESCRIPTION OF THE DRAWINGS

FIGS. 5A and 5B are diagrams illustrating a movement direction of the inert gas according to setting of a direction of a nozzle according to the embodiment of the present invention, FIG. 5A is a diagram illustrating a case where the direction of the inert gas nozzle is set in a direction of the center of a lower portion of a synthesis furnace, and FIG. 5B is a diagram illustrating a case where the direction of the nozzle of the inert gas is set in a spiral shape.

DETAILED DESCRIPTION OF THE EMBODIMENT

Figure 1:
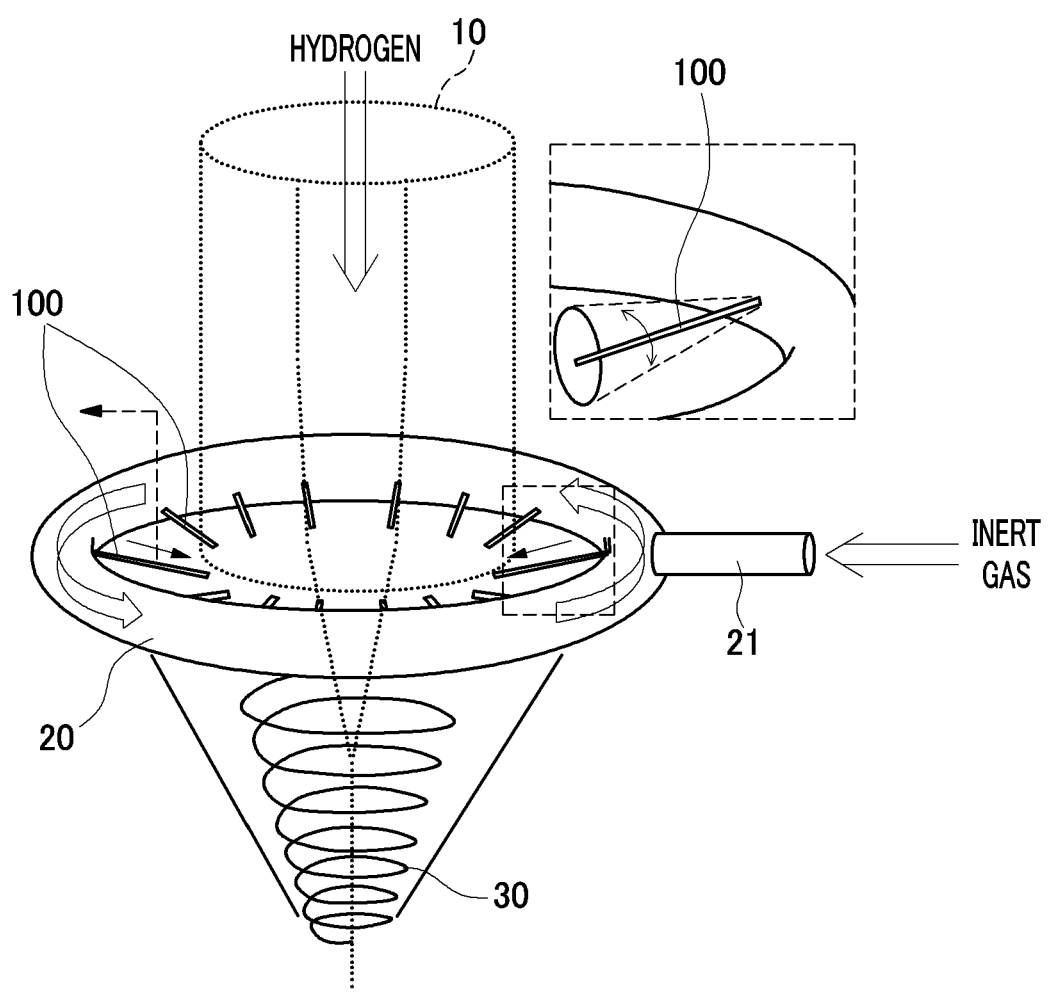
FIG. 1 is a configuration diagram of a carbon nanotube assembly manufacturing apparatus according to an embodiment of the present invention.

Hereinafter, an embodiment of the present invention will be described in detail with reference to the accompanying drawings such that those skilled in the art to which the present invention belongs may easily perform. The present invention may, however, be embodied in many different forms and is not limited to the embodiment described herein. In order to clearly illustrate the present invention, parts not related to the description are omitted in the drawings, and similar parts are denoted by similar reference numerals or symbols throughout the specification.

Throughout the specification, when a part is referred to as being "connected" to another part, this includes not only "directly connected" but also "electrically connected" with another element therebetween. In addition, when a part is referred to as "including" a configuration element, it means that the configuration element does not exclude other configuration elements but may further include other configuration elements unless describes otherwise in particular, and it is to be understood that the configuration element does not preclude presence or addition of one or more other features, numerals, steps, operations, configuration elements, components, or a combination thereof.

Figure 2:
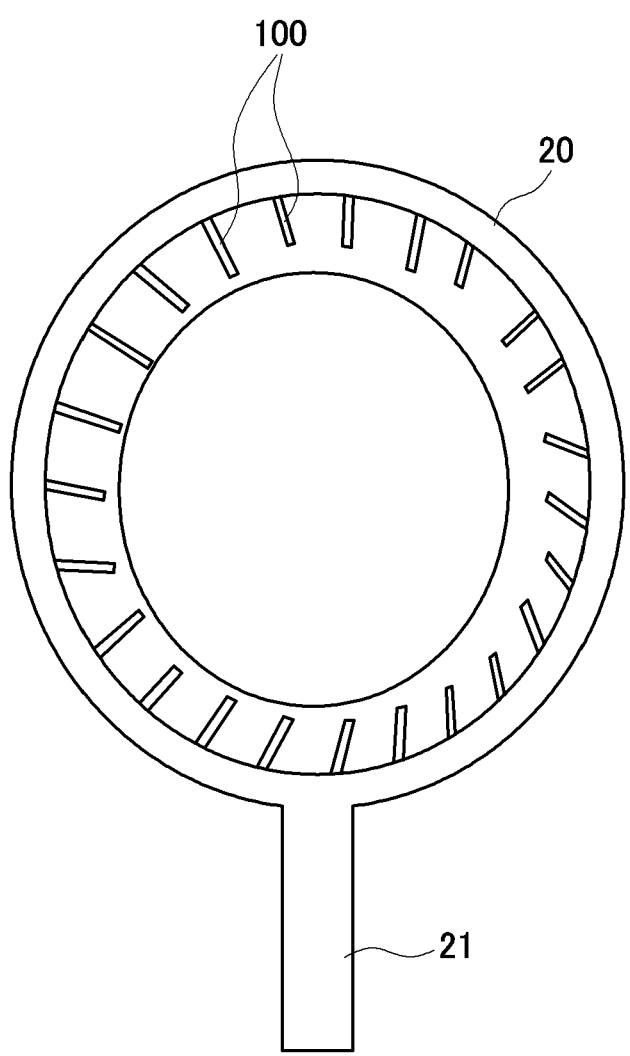
FIG. 2 is a cross-sectional diagram of a gas supply unit according to the embodiment of the present invention.
Figure 3A:
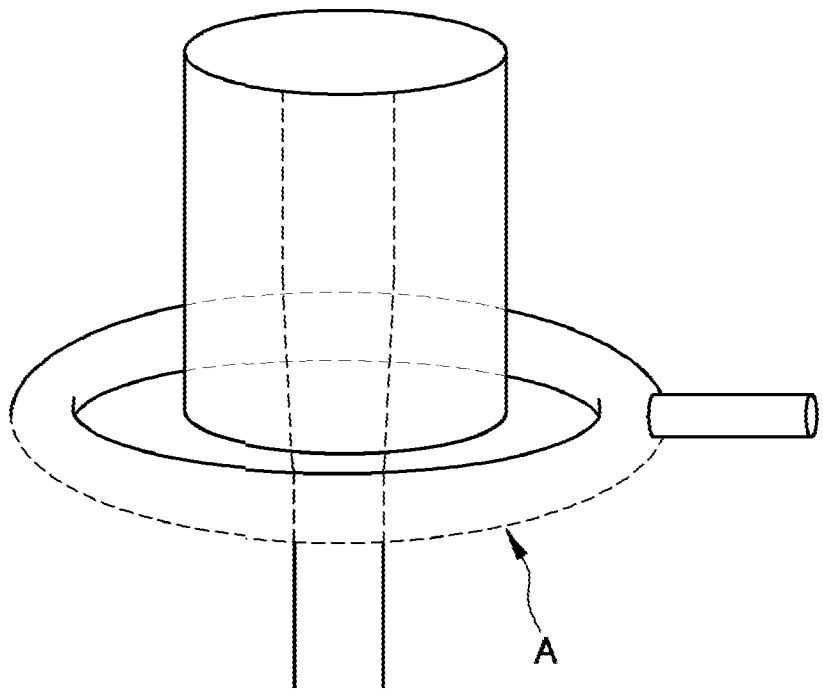
FIG. 3A illustrates a dry convergence device of a related art.
Figure 3B:
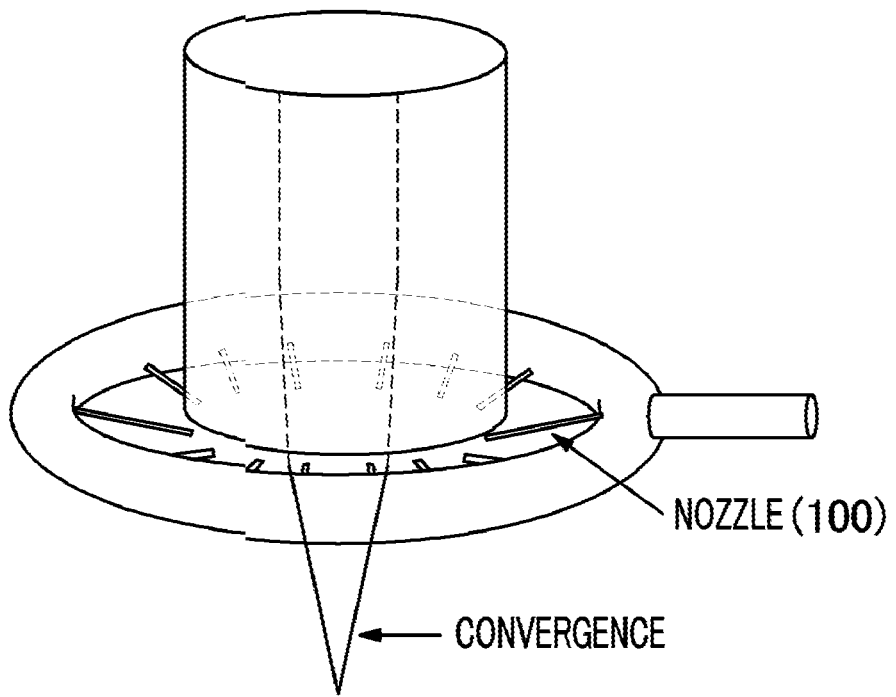
FIG. 3B illustrates a state in which a carbon nanotube assembly according to the embodiment of the present invention is converged.
Figure 4:
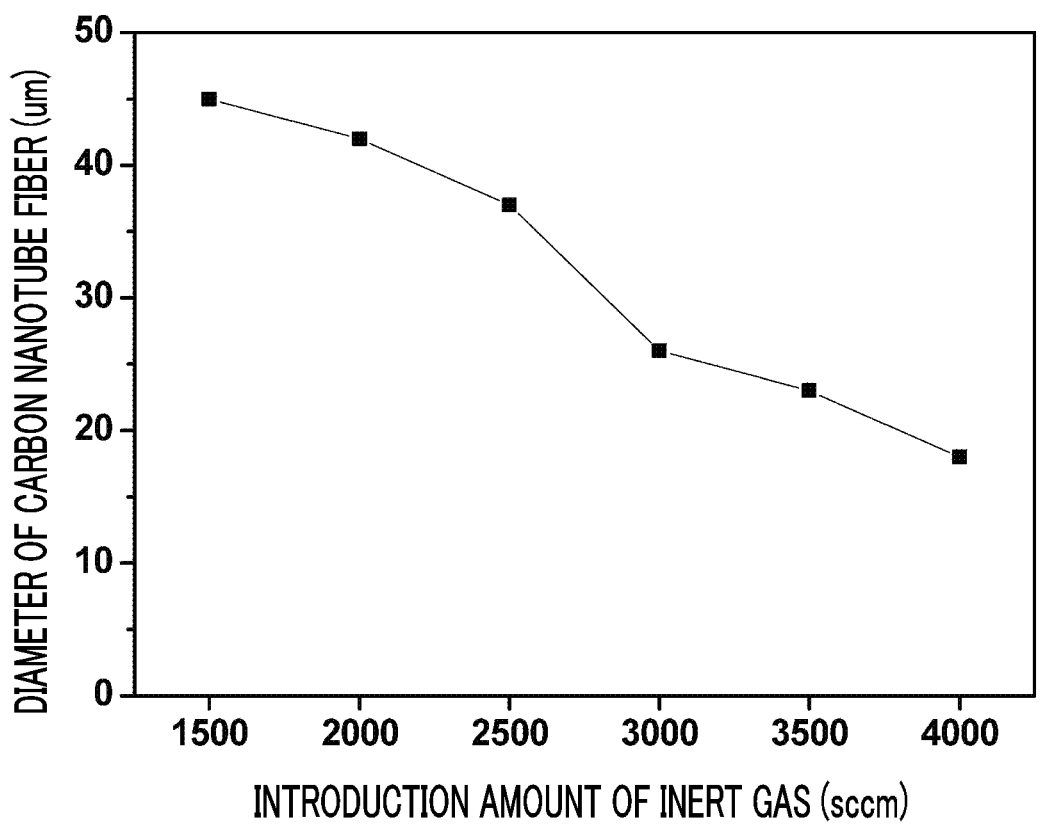
FIG. 4 is a diagram illustrating a diameter changing according to the introduction amount of inert gas of the carbon nanotube assembly manufactured according to the embodiment of the present invention.
Figure 6A:
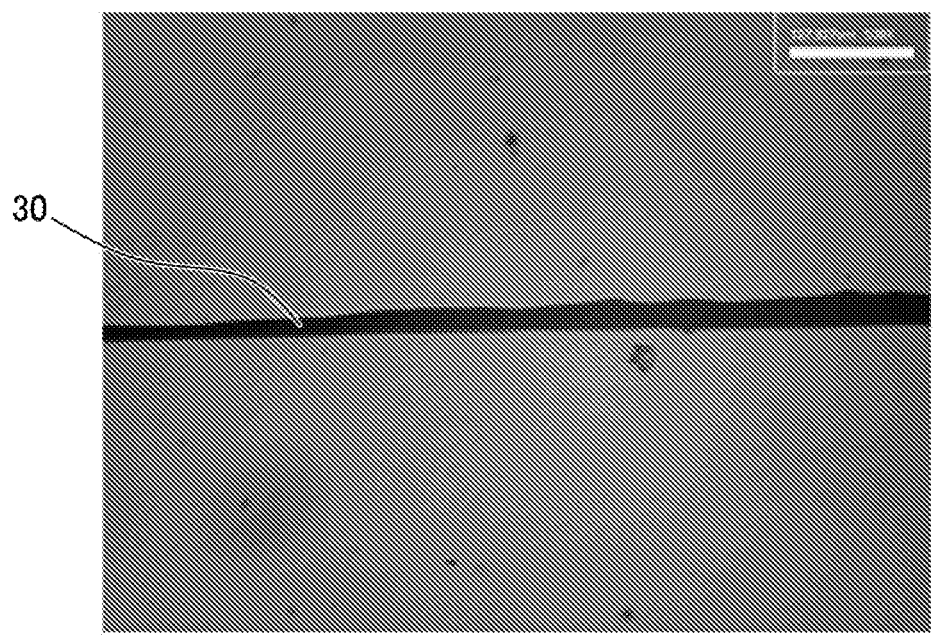
FIG. 6A is a view illustrating the carbon nanotube assembly converged by a linear inert gas flow illustrated in FIG. 5A.
Figure 6B:
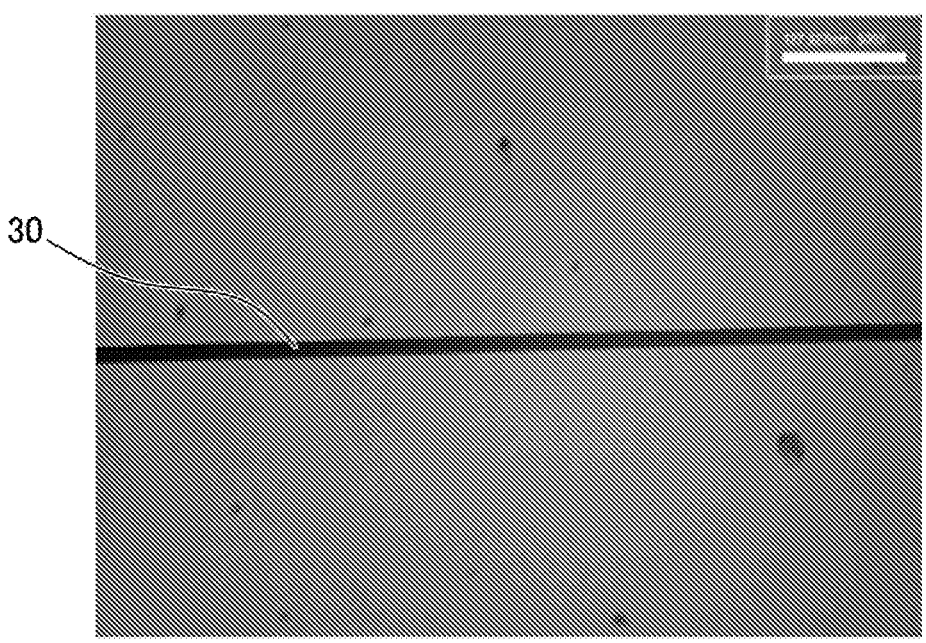
FIG. 6B is a view illustrating the carbon nanotube assembly converged by a spiral inert gas flow illustrated in FIG. 5B.

FIG. 1 is a configuration diagram of a carbon nanotube assembly manufacturing apparatus according to an embodiment of the present invention, FIG. 2 is a cross-sectional diagram of a gas supply unit according to the embodiment of the present invention, FIG. 3A illustrates a dry convergence device of a related art, and FIG. 3B illustrates a state in which a carbon nanotube assembly according to the embodiment of the present invention is converged, FIG. 4 is a diagram illustrating a diameter changing according to the introduction amount of inert gas of the carbon nanotube assembly manufactured according to the embodiment of the present invention, FIG. 5A is a diagram illustrating a case where the direction of nozzle of the inert gas is set in a direction of the center of a lower portion of a synthesis furnace, FIG. 5B is a diagram illustrating a case where the direction of the nozzle of the inert gas is set in a spiral shape, FIG. 6A is a view illustrating the carbon nanotube assembly converged by a linear inert gas flow illustrated in FIG. 5A, and FIG. 6B is a view illustrating the carbon nanotube assembly converged by a spiral inert gas flow illustrated in FIG. 5B.

Referring to FIG. 1, a carbon nanotube assembly manufacturing apparatus according to the present invention includes a synthesis furnace 10 in which a carbon nanotube synthesis space is provided and a gas supply unit 20 which is disposed at a lower portion of the synthesis furnace 10, ejects inert gas through a plurality of nozzles 100, and converges carbon nanotubes discharged from the synthesis furnace 10.

The synthesis furnace 10 has a space for synthesizing carbon nanotube fibers therein. For example, the synthesis furnace 10 may have a cylindrical shape, but a shape and a size thereof may be variously set according to needs of a user.

The plurality of nozzles 100 are disposed along an arc of the gas supply unit 20 so as to surround the carbon nanotubes discharged from the synthesis furnace 10 and may be individually adjusted. At this time, a vortex may be formed in the inert gas ejected through the plurality of nozzles 100. That is, a carbon nanotube assembly twisted by the inert gas having such a vortex may be manufactured. Accordingly, the carbon nanotube assembly manufactured by a carbon nanotube assembly manufacturing apparatus according to the present invention may have increased strength and uniformity ratio. In addition, the inert gas not only blocks outside air but also dilutes hydrogen used for synthesis, and thus, stability thereof may be greatly increased.

Specifically, referring to FIGS. 1 and 2, the gas supply unit 20 may be spaced apart from the center of the synthesis furnace 10 by a predetermined distance and is located so as to have a concentric relationship with the center, and may be a tubular member formed in a circular shape. In addition, the gas supply unit 20 may include a gas injection unit 21 installed at one side thereof to inject inert gas. In one example, the inert gas may be nitrogen but is not limited to this.

The nozzle 100 may have one end fixed to the gas supply unit 20 and the other end extended toward the center of the gas supply unit 20. The nozzle 100 may adjust a supply rate of the inert gas. In one example, when the supply rate of the inert gas is increased such that a diameter of the carbon nanotube assembly is reduced, a contact area between the carbon nanotube assemblies increases. As a result, an effect of load transfer between the carbon nanotubes is improved, and thereby, an electrical contact resistance of the carbon nanotube assembly may be reduced, and mechanical properties may be improved.

The nozzle 100 is adjustable to have an acute angle toward the center of the gas supply unit 20 in any one direction of an upper side, a lower side, a left side, and a right side. In one example, as illustrated in FIG. 1, the other end of the nozzle 100 may be adjusted upward and downward to have an angle of 0° to 90° and may be adjusted to the left and right to have an angle of 0° to 90°.

In addition, the nozzle 100 may be disposed to be inclined in a clockwise direction or a counterclockwise direction so as to have an acute angle with respect to a plane to be coupled with the gas supply unit 20. Illustratively, as illustrated in FIG. 2, when the plurality of nozzles 100 are arranged to be inclined so as to have an acute angle with a wall of the gas supply unit 20 uniformly in a counterclockwise direction by a predetermined angle, the inert gas ejected through the respective nozzles 100 forms a vortex. As a result, the carbon nanotubes discharged from the synthesis furnace 10 may be converged into the carbon nanotube assembly twisted by the vortex of the inert gas.

The carbon nanotube assembly manufacturing apparatus according to the present invention may further include a raw material supply unit 11 that supplies a synthesis raw material for manufacturing a carbon nanotube assembly. The raw material supply unit 11 is formed in a shape in which a surface thereof is surrounded by the synthesis furnace 10 to supply a synthesis raw material, and the synthesis furnace 10 decomposes and reassembles the synthesis raw material in the raw material supply unit 11 to synthesize the carbon nanotubes. At this time, the synthesis raw material is composed of acetone, ferrocene, thiophene or the like, which is only one embodiment, and the present invention is not limited to this.

An embodiment will be described in detail so as to facilitate understanding of the present invention. However, the following embodiment is intended to illustrate contents of the present invention, and the scope of the present invention is not limited to the following embodiment. The embodiment of the present invention is provided to those skilled in the art so as to more fully describe the present invention.

FIG. 3A illustrates a state in which an inert gas is simply introduced through a narrow and long slit A of a dry convergence device, and FIG. 3B illustrates a state in which the inert gas is introduced into the carbon nanotube assembly manufacturing apparatus having the nozzles installed therein according to the present invention. A synthesis solution is composed of acetone of 98 wt %, ferrocene of 0.4 wt %, and thiophene of 1.6 wt %, and transfer gas ($H_2$) is injected at a rate of 1000 sccm, and a synthesis temperature is set to 1200° C.

FIG. 3A illustrates a dry convergence device having the narrow and long slit A at a lower portion thereof, and according to this configuration, it can be seen that the gas is ejected only downward and thereby the carbon nanotubes are not converged. FIG. 3B illustrates the carbon nanotube assembly manufacturing apparatus according to the embodiment of the present invention, and it can be seen that the carbon nanotube assembly is twisted by the inert gas ejected from the nozzles and converged.

That is, when a slit is simply made in the dry convergence device, hydrogen gas explosion due to an inflow of outside air may be prevented, but the carbon nanotube assembly may not be converged. In addition, the inert gas introduced through the hole A may spread in the vertical direction to block the inflow of the outside air, but force to converge a carbon nanotube bundle is not applied to the carbon nanotube assembly. On the other hand, in a case of the dry convergence device having nozzles installed therein, even if the same amount of inert gas is supplied while passing through the nozzles, the inert gas is introduced at a higher rate, torque is applied to the carbon nanotube assembly by a vortex and thereby, the carbon nanotube assembly is twisted.

FIG. 4 is a graph illustrating measurement values of a diameter of the carbon nanotube assembly twisted while the inert gas is supplied by changing the amount of supply. A winding speed of a carbon nanotube fiber is constantly kept at 10 m/min, and a gas supply rate is increased from 1500 sccm to 4000 sccm. As the introduction amount of gas increases, the diameter of the carbon nanotube assembly tends to be reduced because the torque applied to the carbon nanotube assembly is further increased while the introduction amount of the inert gas increases. Accordingly, if the diameter of the carbon nanotube assembly is further reduced, a contact between the carbon nanotubes is further improved. That is, if convergence force increases, a contact area between the carbon nanotubes increases, which improves an effect of load transfer between the carbon nanotubes, and thereby, an electrical contact resistance is reduced and mechanical properties are improved.

FIG. 5A illustrates a case where a direction of an inert gas nozzle is set in a direction of the center of a lower portion of a synthesis furnace, and FIG. 5B illustrates a case where the direction of the inert gas nozzle is set in a spiral shape. As a result, characteristics of the carbon nanotube assembly may be compared. That is, a movement direction of an inert gas flow at the lower portion of the synthesis furnace is changed according to a supply direction of the inert gas, and according to this, the characteristics of the carbon nanotube assembly are changed. As illustrated in FIG. 5A, when the inert gas is supplied by disposing the nozzles in a direction perpendicular to the plane of the gas supply unit 20 to which the nozzles are coupled, that is, in a direction of the center of the gas supply unit 20, a part of the carbon nanotube assemblies is converged but the carbon nanotube assemblies are not twisted. On the other hand, as illustrated in FIG. 5B, if the nozzles are arranged to have an acute angle with respect to the plane of the gas supply unit 20 to which the nozzles are coupled, that is, if the nozzles are arranged to be inclined by a predetermined angle in the clockwise direction or the counterclockwise direction with respect to the center of the gas supply unit 20, the inert gas flow is formed in a spiral shape when the inert gas is supplied, and thereby, the carbon nanotube assemblies are twisted and converged.

FIG. 6A illustrates a carbon nanotube assembly converged by the linear inert gas flow illustrated in FIG. 5A and illustrates an unbalanced uniformity ratio of the carbon nanotube assembly. On the other hand, FIG. 6B illustrates the carbon nanotube assembly converged by the spiral inert gas flow illustrated in FIG. 5B and illustrates that the uniformity ratio of the carbon nanotube assembly is stable because the carbon nanotube assembly is twisted.

The above-described description of the present invention is illustrative, and it will be understood by those skilled in the art that the present invention may be easily modified to other specific forms without departing from the spirit or essential characteristics thereof. It is therefore to be understood that the above-described embodiment is illustrative in all aspects and not restrictive. For example, each configuration element described as a single type may be dispersively implemented, and configuration elements dispersively described may also be implemented in a combined form.

The scope of the present invention is defined by the appended claims rather than the detailed description, and it should be construed that all changes or modifications derived from the meaning and scope of the claims and their equivalents are included in the scope of the present invention.

DESCRIPTION OF SYMBOLS

10: synthesis furnace
20: gas supply unit
11: raw material supply unit
21: gas injection unit
100: nozzle

What is claimed is:

1. A carbon nanotube assembly manufacturing apparatus comprising:
    a synthesis furnace having a carbon nanotube synthesis space inside; and
    a gas supply unit that is disposed at a lower portion of the synthesis furnace and ejects an inert gas through a plurality of nozzles to converge carbon nanotubes discharged from the synthesis furnace,
    wherein the plurality of nozzles are arranged along an arc of the gas supply unit so as to surround the carbon nanotubes discharged from the synthesis furnace and are individually adjustable,
    wherein the gas supply unit is spaced apart from a center of the synthesis furnace by a predetermined distance, is located so as to have a concentric relationship with the center, and is a tubular member formed in a circular shape.

2. The carbon nanotube assembly manufacturing apparatus according to claim 1, wherein the nozzle has one end fixed to the gas supply unit and the other end extended toward a center of the gas supply unit.

3. The carbon nanotube assembly manufacturing apparatus according to claim 1, wherein the nozzle is adjustable to have an acute angle toward a center of the gas supply unit in any one direction of an upper side, a lower side, a left side, and a right side.

4. The carbon nanotube assembly manufacturing apparatus according to claim 1, wherein the nozzle is disposed to be inclined in a clockwise direction or a counterclockwise direction so as to have an acute angle with respect to a plane to be coupled with the gas supply unit.

5. The carbon nanotube assembly manufacturing apparatus according to claim 1, wherein the nozzle is capable of adjusting a supply rate of the inert gas.

6. The carbon nanotube assembly manufacturing apparatus according to claim 1, further comprising:
    a raw material supply unit that supplies a synthesis raw material for manufacturing the carbon nanotube assembly.

7. The carbon nanotube assembly manufacturing apparatus according to claim 1, further comprising:
    a gas injection unit that is installed at one side of the gas supply unit and injects the inert gas.

* * * * *